United States Patent [19]

Ihlein

[11] Patent Number: 4,478,906

[45] Date of Patent: Oct. 23, 1984

[54] IMPREGNATED INSULATING TAPE FOR FABRICATING AN INSULATING SLEEVE FOR ELECTRIC CONDUCTORS

[75] Inventor: Walter Ihlein, Berlin, Fed. Rep. of Germany

[73] Assignee: Siemens Aktiengesellschaft, Munich, Fed. Rep. of Germany

[21] Appl. No.: 489,388

[22] Filed: Apr. 28, 1983

[30] Foreign Application Priority Data

May 13, 1982 [DE] Fed. Rep. of Germany ....... 3218287

[51] Int. Cl.³ .......................... B32B 5/16; B32B 27/38
[52] U.S. Cl. .................................... 428/324; 428/363; 428/413; 428/411.1; 428/420; 528/89; 528/93
[58] Field of Search ...................... 528/89, 92, 93, 408, 528/409, 365; 428/324, 363, 411, 413, 454, 420

[56] References Cited

U.S. PATENT DOCUMENTS

| | | | |
|---|---|---|---|
| 3,347,951 | 10/1967 | Vasta | 528/93 |
| 4,069,055 | 1/1978 | Crivello | 528/409 |
| 4,189,577 | 2/1980 | Sawa et al. | 544/222 |
| 4,205,156 | 5/1980 | Sawa et al. | 528/117 |
| 4,336,302 | 6/1982 | Ihlein | 428/324 |
| 4,370,465 | 1/1983 | Whiteside et al. | 528/89 |
| 4,400,676 | 8/1983 | Mitsui | 428/324 |
| 4,405,765 | 9/1983 | Demmler et al. | 528/92 |
| 4,405,766 | 9/1983 | Bertram et al. | 528/89 |

Primary Examiner—John Kight
Assistant Examiner—Garnette D. Draper
Attorney, Agent, or Firm—Kenyon & Kenyon

[57] ABSTRACT

An insulating tape for manufacturing an insulating sleeve for electric conductors, impregnated with a heat-hardening epoxy resin-acid anhydride hardener mixture, contains a self-hardening bonding agent-accelerator composition of an epoxy resin as the bonding agent and a quarternary onium salt as the accelerator. To prevent migration of the charge carriers present in the accelerator, the accelerator further has a group which can react with the bonding agent-impregnating resin mixture. This group causes a fixation of the accelerator in the lattice produced during the hardening.

13 Claims, No Drawings

IMPREGNATED INSULATING TAPE FOR FABRICATING AN INSULATING SLEEVE FOR ELECTRIC CONDUCTORS

BACKGROUND OF THE INVENTION

The invention relates to an insulating tape for fabricating an insulating sleeve for electric conductors which is impregnated with a heat-hardening epoxy resin-acid anhydride hardener mixture. It is especially useful for the winding bars or coils of electric machines.

Insulating tapes which incorporate hardened epoxy resins are known, see for example U.S. Pat. No. 4,336,302. Also known are tapes with epoxy resins which incorporate bonding agent-accelerator systems. When the systems employ quaternary onium salts as accelerators, effective binding for most epoxy resin is provided. Furthermore, use of quaternary onium salts as accelerators will cause practically no ionic polymerization of epoxy compounds at room temperature. As a result, an insulating tape impregnated with an epoxy compound binder-quaternary onium accelerator can be stored at room temperature for up to more than three months without changing its properties. The quaternary onium salts also can cause polymerization of an epoxy resin-acid anhydride mixture at temperatures near 60° C. and the polymerization time is substantially accelerated, so that it is possible to harden the portion of impregnating resin penetrating the insulating tape in an economically short time.

The bonding agent-accelerator system provided in this manner remains fully soluble in the impregnating resin under the conditions of drying and preheating as would be applied to insulating sleeves wound from insulating tapes prior to the impregnation of the sleeves with resin-hardener. There is no decrease in the hardening and accelerator reactivity relative to the reactivity of a combination of an impregnating resin and bonding agent accelerator system which is added to an insulating sleeve wound from tape unimpregnated with resin or the system.

According to present understanding, the known accelerators based upon quaternary onium salts are preserved in the system unchanged during the hardening of the impregnating resin and do not join the hardened bonding agent-impregnating resin body. Since they contain electrically charged particles, the possibility therefore exists that a field-oriented migration or alignment of these particles could occur due to the voltages applied to the insulating sleeves in operation. As a result, the insulation resistance would drop.

Although no indication has been observed so far in the insulating sleeves made with known bonding agent-accelerator mixtures and investigated as to such migration in a formed, hardened bonding agent-impregnating resin material, it is an object of the invention to prevent such a process from the start in an insulating tape of the type described above.

SUMMARY OF THE INVENTION

These and other objects are achieved by the invention which is directed to an insulating tape containing an epoxy resin, inorganic material, a flexible substrate, and a bonding agent-accelerator composition. More specifically the tape includes an epoxy resin with an organic acid anhydride hardener and planar, breakdown-proof, inorganic material such as mica scales or fine mica layers, which is applied to a flexible support and cemented thereto, cemented to itself and, if desired, to a cementing terminating cover layer by means of a composition comprising a bonding agent/accelerator mixture which is self-hardening at the setting temperature of the impregnating resin, the bonding agent being an epoxy resin and the accelerator being a quaternary onium salt of the following general structure formula

$$M[R_1R_2R_3R_4]^+X^-$$

wherein M is an atom of the 5th main group of the periodic system, especially N and P, $R_1$, $R_2$, $R_3$ and $R_4$ are identical or different aliphatic, aromatic, heterocyclic or aryl-aliphatic radicals which may contain still further quaternary atoms, and X is an anion such as Cl, Br, I, F, $NO_3$, $ClO_4$, an organic acid radical such as acetate, or a complex anion such as $BF_4^-$, $PF_6^-$ and the like.

The R radicals ($R_1$, $R_2$, $R_3$, $R_4$) or two thereof can be bound to the central atom, or in addition can be bound to each other. Also, the quaternary central atom M can be incorporated into a ring system which may contain multiple bonds.

According to the invention, at least one of the substituents of the central atom M or of the heterocyclic system formed with the central atom has a group which is capable of reacting with the bonding agent-impregnating resin mixture. In the hardening of the impregnating resin, fixation of the accelerator compound in the lattice produced is possible with this group. Thus, migration of the accelerator is not possible.

It is particularly advantageous for the foregoing purpose if the accelerator contains an epoxy group or a hydroxyl group because these make particularly highly storage-stable insulating tapes. This is true also if the bonding agent contains hydroxyl as well as epoxy groups.

Other radicals capable of reaction are mercaptan-groups (SH), carboxyl (COOH) groups, amino or imino ($NH_2$, NH—) groups, which may be present individually or mixed.

DETAILED DESCRIPTION OF THE INVENTION

The accelerator according to the invention solves the prospective problem of charged group migration in an insulation material impregnated with binder which is to be used for electrical applications. This is accomplished by the provision that at least one of the substituents on the quaternary onium accelerator compound is capable of reacting with the impregnating epoxy resin and/or bonding agent.

Examples for such quaternary onium salts are, for instance, the reaction products of corresponding tertiary amines or phosphines such as tributylamine, dimethylbenzylamine, 1,2-dimethylimidazol, pyridine, tributylphosphine, triphenylphosphine with compounds such as epichlorohydrin, epibromohydrin, 2,3-dihydroxypropylchloride or bromide or hydrogen halogenide addition products of epoxy or polyepoxy compounds.

In the insulating tape designed in accordance with the invention, the following epoxy resins can be used as the bonding agent:

Epoxy compounds such as bisphenol A-diglycidyl ether, resorcine diglycidyl ether, epoxidized phenol or cresol novolakes as well as N-glycidyl compounds such as heterocyclic epoxy compounds with a hydantoin base. Further epoxies are listed in "Handbook of Epoxy Resins" by H. Lee and K. Neville (McGraw-Hill Book Co., 1967). Particularly advantageous is the use of higher-functional epoxidized phenol or cresol novolakes and hydantoin epoxy resins, which are excellent bonding agents for the insulating tapes provided because of their high viscosity and adhesion power.

The bonding agent concentration is chosen so that it is not too high a value in manufacturing the insulating tape. As a result, the impregnating resin can penetrate in a facile fashion into the voids in the tape during the impregnation. The weight content of the compounds used as the bonding agent for cementing the insulating tape is therefore between 3 and 10%, relative to the total weight of the insulating tape. With such a bonding agent content it is advisable to set the amount of accelerator approximately in the order of 0.05 to 5%, relative to the total weight of the insulating tape. The amount of accelerator added to the insulating tape in its manufacture depends on how much inorganic material, for instance, mica, is contained in the tape and on how large the content of bonding agent used for the cementing is in the insulating tape.

A further improvement of the insulating constructed from insulating tapes according to the invention, which have great stiffness, is addition of further hardeners to the bonding agent-accelerator mixture which become effective only at the hardening temperature of the heat-hardening epoxy resin-acid anhydride mixture. Thereby, the dimensional heat stability of the self-hardening bonding agent-accelerator mixture as well as of the mixture between the bonding agent and the penetrated impregnating resin is increased further. These additions, however, have no adverse effect on the storage ability of the insulating tape. Also, this binding agent-accelerator mixture with additional hardener remains fully soluble under the conditions of drying and preheating prior to the impregnation of the insulation.

Particularly well suited are additives acting as hardeners which are insoluble in the bonding agent up to approximately 80° C. and have a sufficiently high melting point relative to the setting temperature, such as 2-phenyl-4,5 dihydroxymethylimidazol. Such additives show their activity only at the temperatures of hardening, while polymerizing of the impregnating resin penetrating into the insulating sleeve is produced in the temperature range about 60° C. by the quaternary onium compounds which are likewise present in the bonding agent.

As additives are further suited complex compounds or adducts which are decomposed into hardening-effective components only at the hardening temperatures. These are compounds as described in U.S. Pat. Nos. 4,189,577 or 4,205,156, or salts of trimellitic acid with imidazols such as 1-cyanoethyl-2-methylimidazol trimellitate.

It is further advantageous to use as additives encapsulated hardener systems or hardener systems which are absorbed by substances with a large active surface. These are released and become active only at the hardening temperature or through exchange with other compounds. Thus, tertiary amines absorbed, for instance, in molecular sieves can be used.

The amount of these hardeners admixed to the bonding agent depends on their specific effectiveness and comprises the range between 0.05 and 10% by weight referred to the bonding agent.

In the following description, the behavior of insulating tapes constructed in accordance with the invention will be explained, by reference to Tables 1 to 3.

TABLE 1

| Epoxy Agent | Accelerator | Wt. Parts Accel. per 1000 Wt. Parts Epoxy Resin | Storage Stability of the Mixtures (Days) at R.T. | 70° C. | Rxn Time 130° C. (hours) |
| --- | --- | --- | --- | --- | --- |
| A | 1 | 10 | 100 | 30 | 120 |
| B | 1 | 10 | 100 | 30 | 100 |
|   | 2 | 25 | 100 | 30 | 80 |
| C | 1 | 25 | 100 | 30 | 150 |

The compositions described in Table 1 are the bonding agent accelerator mixtures. The compilation presented illustrates the storage stability of these mixtures, which were stored in thin layers in an open vessel. The mixtures are formulated from three characteristic epoxy agent types A, B, C with different compounds 1 and 2 serving as accelerators, of the mixtures. The accelerators are as follows:

1. Reaction product of 1-methylimidazol (1 mol) and epibromohydrin (1 mol).

2. Reaction product of 1-methylimidazol (1 mol) with the addition product of 1 mol bisphenol A-diglycidyl ether and 1 mol hydrogen bromide.

The compounds were dissolved while heating (at 70° C.) or by means of methylene chloride as a solution-promoting agent in the respective epoxy agents A, B and C, where A means a glycidyl ether of bisphenol A with an epoxy equivalent of 174±2 and a viscosity of 5000+500 mPas at 25° C., B, a semisolid epoxidized phenol novolak with an epoxy equivalent of 178±5 and a viscosity of 1600±300 mPas at 80° C., and C, a semisolid trifunctional hydantoin epoxy resin with an epoxy equivalent of 166 and a viscosity of about 6000 mPas at 80° C.

From Table 1, the small effectiveness of these compositions with respect to ionic polymerization in the temperature range of about 70° to 80° C. can clearly be seen.

TABLE 2

| Bonding Agent-Accelerator Mixture | Wt. Parts Bonding Agent-Accelerator Mixture per 100 Wt. Parts Epoxy H.-Acid Anh. | Polymerizing Time (min) of the Epoxy H.-Acid Anhydride Bonding Agent-Accelerator Mixture | |
| --- | --- | --- | --- |
|  |  | 70° C. | 90° C. |
| A1 | 22 | 124 | 31 |
| B2 | 25 | 114 | 28 |
| C1 | 22 | 205 | 58 |

Table 2 shows the excellent accelerator effect of these types of compositions on bonding agent-accelerator mixture on epoxy resin acid anhydride hardener polymers. The tests were carried out with an epoxy resin acid anhydride of a glycidyl ether of bisphenol A (epoxy resin A) and methylhexahydro-phthalic acid anhydride.

The examples shown in the tables clearly show the effects of the quaternary onium compounds as the accelerator portion of a bonding agent-accelerator mixture composition of an insulating tape designed in accordance with the invention. The insulating tapes made with the bonding agent-accelerator compositions detailed here can be stored for more than 3 months at room temperature and, after the insulating sleeve is impregnated with an epoxy-acid anhydride resin, it is assured in the hardening through the special choice of the bonding agent-accelerator mixture that all points are set, i.e., also points, at which the bonding agent was not resorbed by the impregnating resin, since the bonding agent-accelerator mixture is self-hardening. Thus, an insulation with very good electrical properties and high dimensional heat stability is obtained.

TABLE 3

| Epoxy Resin | Accel- erator | Hardener | Wt. Parts Hardener per 100 Wt. Parts Epoxyh. | Storage Stability of the Mixtures (Tgen) at Room Temp. | 70° C. | Rxn Time at 130° C. (hours) |
|---|---|---|---|---|---|---|
| B | (a) | 1 | 5 | 100 | 5 | 10 |
| D |  | 2 | 5 | 100 | 3 | 8 |

(a) Reaction Product of 1 mol (1-methylimidazol) and 1 mol (epibromohydrin).

Table 3 contains data on the storage stability of bonding agent mixtures with a quaternary onium compound as accelerator and some specific hardeners as additives for this bonding agent-accelerator mixture. Also, from this is clearly seen a low reactivity of the additives on the bonding agent of the insulating tape up to a temperature range of 70° C. A comparison with Table 1 shows for the temperature range about 70° C. a somewhat higher reactivity overall, but at room temperature, the excellent stability of the mixtures prevails also here. As bonding agent were used, for instance, epoxy resin B and epoxy resin D=tetraglycidyl-p,p'-methylenedianiline with an epoxy equivalent of 130±10 and a viscosity of about 1800 mPas at 80° C. As additives served the hardeners 1 and 2, where 1 is 2,4-diamino-6-(2'-methylimidazolyl)-(1'-ethyl)-s-triazine; and 2 is 2-phenyl-4,5-dihydroxymethylimidazole.

Through the increase of the vitrification point of the hardened bonding agent, achievable by means of the additives, by about 30° to 40° C., the stiffness of the insulating sleeve is increased further and its mechanical strength at high temperatures is raised further.

What is claimed is:

1. An insulating tape suitable for manufacturing an insulating sleeve for electric conductors which tape is impregnated with a thermo-setting epoxy resin/acid anhydride hardener mixture, which comprises at least one layer of particles of an inorganic, breakdown-proof planar material selected from the group consisting of mica flakes and thin mica films, said layer being bonded to a flexible substrate and said material particles being bonded to each other with an epoxy resin binder containing as an accelerator for promoting the hardening reaction of the resin used for impregnation, a quaternary onium salt having the following structural formula:

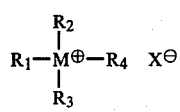

wherein:

M is an atom of the fifth main group of the periodic system of the elements;

$R_1$, $R_2$, $R_3$ and $R_4$ are the same or different aliphatic, aromatic, heterocyclic or arylaliphatic radicals, or two or three of said radicals form with M at least one heterocyclic ring, at least one of the radicals $R_1$, $R_2$, $R_3$, $R_4$ or the heterocyclic ring formed with the central atom has at least one moiety which can react with the bonding agent impregnating resin mixture, said moiety being selected from an epoxy, a hydroxy, a mercapto, a carboxyl, an amino or an imino group;

X is an anion selected from the group consisting of Cl, $ClO_4$, an aliphatic or aromatic organic acid radical, and a complex inorganic anion; and said mixture of binder and accelerator form a system which is self-hardening at the setting temperature of the thermosetting impregnating resin.

2. An insulating tape according to claim 1 wherein M is selected from the group consisting of nitrogen and phosphorous.

3. An insulating tape according to claim 1 wherein the accelerator contains epoxy groups.

4. An insulating tape according to claim 1, wherein the accelerator contains hydroxyl groups.

5. The insulating tape according to claim 1, wherein the accelerator contains reactive groups selected from epoxy, hydroxy, carboxylic acid or amine groups or a combination thereof.

6. The insulating tape according to claim 1, wherein said mixture of binder and accelerator further contains an admixture acting as a hardener which becomes effective only at the setting temperature of the thermo-setting epoxy resin/acid anhydride hardener mixture, the amount of said admixture being from about 0.05 to about 10% by weight, referred to the weight of the binder.

7. The insulating tape according to claim 6, wherein said admixture is insoluble in the binder to approximately 80° C. and has a sufficiently high melting point relative to the setting temperature of the resin.

8. The insulating tape according to claim 7 wherein said admixture is 2-phenyl-4,5-dihydroxymethyl imidazole.

9. The insulating tape according to claim 6 wherein said admixture is a complex compound or adduct which is decomposed only at the setting temperature into a hardening-effective component.

10. The insulating tape according to claim 6 wherein said admixture is an encapsulated hardener system which is released and becomes effective only at the setting temperature or through exchange with other compounds.

11. The insulating tape according to claim 6 wherein said admixture is a hardener system absorbed on a substance having a large surface area which is released and becomes effective only at the setting temperature or through exchange with other compounds.

12. The insulating tape according to claim 1 wherein the weight percent of the bonding agent is from about 3 to about 10% relative to the weight of the tape.

13. The insulating tape according to claim 1 wherein the weight percent of the accelerator is from about 0.05 to 5% relative to the weight of the tape.

* * * * *